UNITED STATES PATENT OFFICE.

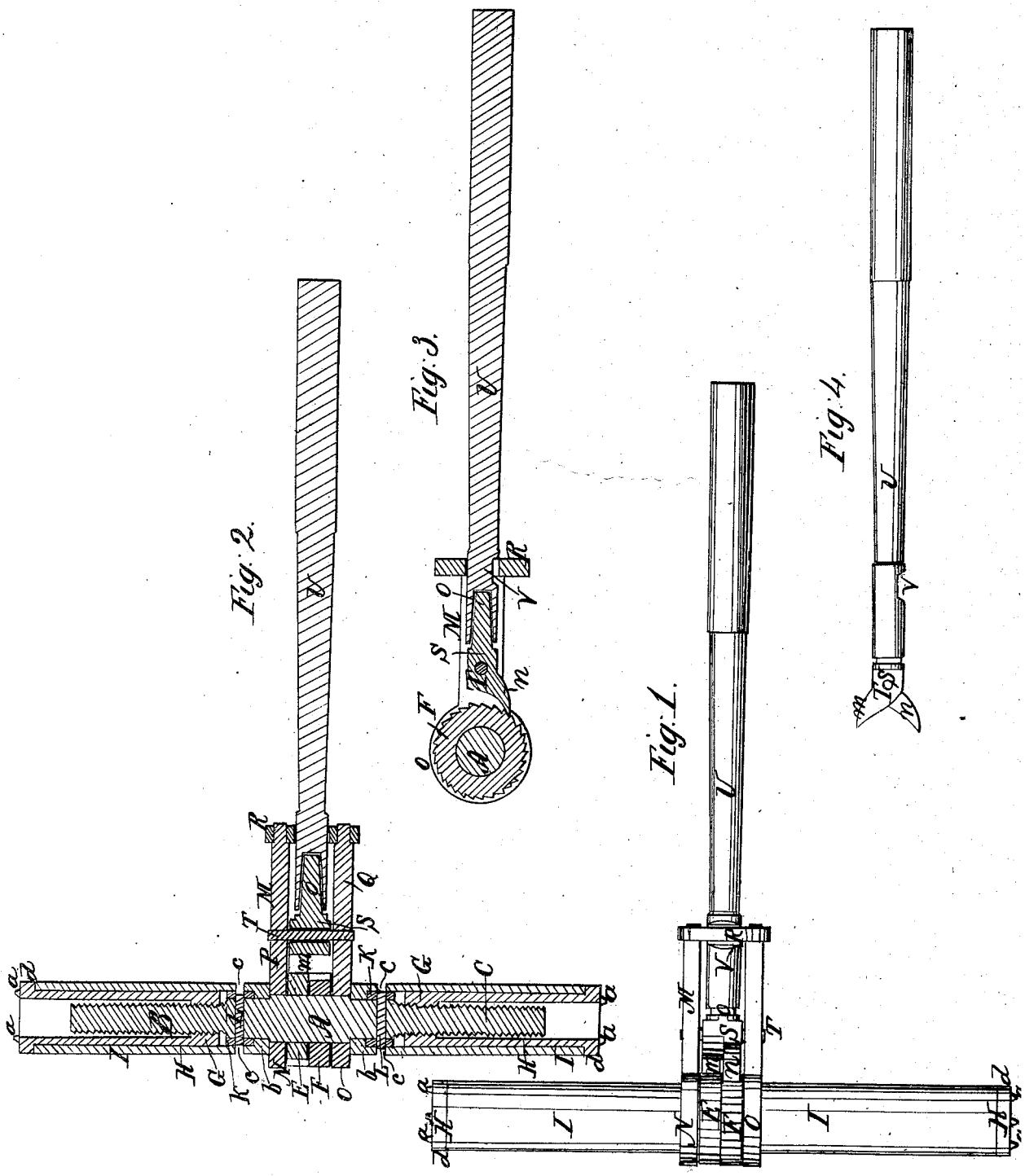

F. ELLIS AND B. S. BUCKLEY, OF ROXBURY, MASSACHUSETTS.

SCREW-JACK.

Specification of Letters Patent No. 5,913, dated November 14, 1848.

*To all whom it may concern:*

Be it known that we, FREEMAN ELLIS and BENJAMIN S. BUCKLEY, of Roxbury, in the county of Norfolk and State of Massachusetts, have made an invention of a new and useful Improvement in Screw-Jacks for Raising Heavy Bodies, Such as Locomotives, Cars, Buildings, &c.; and we do hereby declare that the same is fully represented and described in the following specification and accompanying drawings, letters, figures, and references thereof.

Of the said drawings, Figure 1, denotes a side elevation of our improved jack screw. Fig. 2, a vertical and central section of the same. Fig. 3, a horizontal, central, and transverse section of it. Fig. 4, is a top view of the key lever and movable metallic dog piece which operates in connection with the ratchet or ratchet wheels to be hereinafter described.

In said figures A, represents a long shaft having two male screws B, C, cut or made upon it as seen in Fig. 2, one of them being a right threaded screw, and the other a left threaded one. Said shaft also has two ratchet wheels E, F, fixed to and upon its middle part; the teeth of one of the ratchet wheels being made to stand in one direction, while those of the other wheel are made to stand in the opposite direction. In connection with each male screw a female screw G, made upon the lower end of a tube H, operates, the thread of the said female screw being made applicable to that of the male screw on which it works.

Each tube H, has a series of any suitable number of points or projections $a$, $a$, &c., extending from its extreme outer end as seen in the drawings. Each of the said tubes H, H, works in one of two tubes I, I, whose internal diameter is made to agree with the external diameter of the tube H, in such manner as to allow the tube H, to slide freely and closely into and out of the tube I. Each of said tubes I, I, is closed at its bottom or inner end (as seen at $b$, $b$,) with the exception of a cylindrical hole made through the bottom and just large enough to receive the shaft, and permit it to pass through it as seen in Fig. 2.

A cylindrical ring or collar K, K, of an external diameter corresponding with the internal diameter of the tube I, is placed upon the shaft A, and within each tube I, as seen in Fig. 2, the said collar or ring being held in position or confined to the shaft by a round pin L, which is passed through the collar and shaft, and is made of a length equal to or a little less than the external diameter of the collar. In order to put the said pin in place or remove it at any time two holes $c$, $c$, are bored through opposite sides of the tube I, in line with the passage made through the collar and shaft and for the reception of the pin. When each collar and its pin are adjusted to their proper positions the shaft A, will be not only connected to the two tubes I, I, but be free to turn around within them while they are stationary. The outer end of each tube H, is made to project over that of its tube I, as seen at $d$, $d$, and each tube I, is made to extend beyond the end of the screw B, within it as seen in Fig. 2. The tube I, thus serves to steady the female screw tube H, and thereby prevent any lateral strain on the threads of the male and female screws within it. The two tubes H, and I, of each screw B, operating together prevent those injurious effects from lateral strain on the threads of the screws which would otherwise occur or be likely to take place if the screw tube H, and screw B, were used without any outside or inclosing tube I, as seen in the drawings.

By employing the two tubes H, I, in connection with each screw B, the screws are made to operate with very little or no friction, consequent upon the lateral strain, or tending of the screw B, and nut tube H, to bend laterally when in use and thus injure the screw threads, a difficulty often experienced.

Having thus explained the method of constructing the lifting machinery of the jack, we now proceed to describe the peculiar lever and dog piece and other parts by which the shaft A, and its screws are revolved either in one or the opposite direction as circumstances may require.

The shaft A, has a frame M, composed of two collars N, O, (which play loosely on or around the shaft and are arranged outside of the ratchet wheels, as seen in the drawings,) two parallel bars P, Q, (extending respectively from the collars,) and across circular plate R, united to the bars P, Q, the whole being as seen in the drawings. The frame M, contains or carries the double dog piece S, which is disposed between the two bars P, Q, and works or plays on a pin or fulcrum T, passes vertically through it and the said two bars P, Q. Two teeth or dogs m, n, stand out from that end of the dog piece which is immediately contiguous to the ratchet wheels, one of said teeth being so arranged as to be made to play into one of the ratchet wheels, while the other is made to operate in the other ratchet wheel. A square head o, is made to project form, and make part of, the dog piece as seen in the drawings. It is adapted to a key or key lever U, which has a square passage or hole made in one end of it for the purpose of receiving the said square head. The said lever is made to pass through a hole bored through the plate or circular piece R, and of a size or diameter equal to that of the key of the said lever. A notch V, is cut out of the side of the lever or key part thereof, and in that part of the lever or key which lays in the hole of the plae R, when the lever is fitted or placed on the square head of the dog piece. The said notch should be of a size sufficient to allow of the movement of the dog piece on its fulcrum so as to carry or cause to enter one of the two dogs or teeth m, n, between any two consecutive teeth of its ratchet, and so as to cause the dog to act against one of the said teeth and thereby turn the ratchet wheel and shaft, when power is applied to the lever in the proper direction. When that side of the key piece or key lever which is opposite to the notch, is borne in the opposite direction so as to rest against the side of the passage through the piece R, both of the teeth of the dog piece should be moved out of or be out of action upon their ratchets, in order that the lever and frame M, may be moved around upon the shaft. When next moved in an opposite direction the notch of the lever will allow the lever to be moved so as to cause one of the teeth to take into its ratchet wheel, and so as, when the lever is moved further, to cause a rotation of the shaft and its screws. By removing the lever from the square head of the dog piece, and reversing the lever or turning it 180° on its longitudinal axis and again applying it to the square head, the other tooth of the dog piece may be brought into operation on its ratchet wheel in a similar manner and so as to reverse the motion of the screws.

Therefore if we apply the jack so constructed under a locomotive or heavy body, we can readily raise the same or lower it as occasion may require. A jack may be made to operate with only one male screw B, female screw G, tube H, tube I, collar K, two ratchet wheels, frame M, and its dogged piece and lever, applied to a shaft A, but we prefer the jack made as represented in the drawings; or with two screws B, C, and their adjuncts, as we obtain thereby and by one movement of the lever double the rise or fall of a body acted upon by the jack than can be produced when the jack is made with but one screw B, and in other respects as specified; besides we get rid of the great friction occasioned by the collar of the ordinary screw jack.

We therefore claim—

1. In combination with the two ratchet wheels and lever apparatus for rotating them and their shaft, the two sets of screw mechanism extending from the shaft on which they are placed, the whole being constructed and made to operate substantially as specified; not meaning in the above to claim a simple duplication of a screw jack and lever apparatus, but meaning to claim the combination of the two jacks or the double jack with but one lever apparatus in the manner as specified.

2. We also claim, the particular manner in which we construct the key lever, the frame M, and dogged piece, so as to operate together as above explained; that is to say, the said key lever being made with a notch V, and the said frame M, being made with a hole through its end piece R, to receive said lever and allow it and the dog piece to operate, and the other parts being constructed and applied together as hereinbefore set forth.

In testimony whereof we have hereto set our signatures this fifth day of April, A. D. 1848.

FREEMAN ELLIS.
BENJAMIN S. BUCKLEY.

Witnesses:
R. H. EDDY,
CALEB EDDY.